United States Patent
Kim et al.

(10) Patent No.: US 8,670,364 B2
(45) Date of Patent: Mar. 11, 2014

(54) METHODS AND SYSTEMS FOR SUPPORTING MIMO BURSTS FOR MULTICAST AND BROADCAST SERVICES

(75) Inventors: Wan Ho Kim, Pleasanton, CA (US); Chun Woo Lee, San Ramon, CA (US); Jong Ro Park, San Ramon, CA (US); Doo Seok Kim, Pleasanton, CA (US); Jong Hyeon Park, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 12/405,236

(22) Filed: Mar. 17, 2009

(65) Prior Publication Data
US 2010/0118756 A1    May 13, 2010

Related U.S. Application Data

(60) Provisional application No. 61/114,451, filed on Nov. 13, 2008.

(51) Int. Cl.
*H04J 3/24* (2006.01)
(52) U.S. Cl.
USPC .......................... 370/312; 455/562.1
(58) Field of Classification Search
USPC .......................... 370/312; 455/562.1
See application file for complete search history.

(56) References Cited

U.S. PATENT DOCUMENTS

| | | | |
|---|---|---|---|
| 7,826,848 B2 * | 11/2010 | Tao et al. | 455/436 |
| 2004/0218697 A1 | 11/2004 | Liu | |
| 2006/0264218 A1 * | 11/2006 | Zhang et al. | 455/450 |
| 2008/0123645 A1 | 5/2008 | Pichna et al. | |
| 2009/0219849 A1 * | 9/2009 | Alpert et al. | 370/312 |
| 2011/0051666 A1 * | 3/2011 | Kim et al. | 370/328 |

FOREIGN PATENT DOCUMENTS

| | | |
|---|---|---|
| EP | 1718096 | 11/2006 |
| EP | 1953953 | 8/2008 |
| WO | WO2006085732 | 8/2006 |

OTHER PUBLICATIONS

U.S. Appl. No. 61/021,310 by Kim.*
Gur, Gurkan et al: "On the Use of WiMAX as the Terrestrial Segment for DVB-SH Networks," IEEE International Workshop on Satellite and Space Communications, 2008. IEEE, Piscataway, NJ, USA, (Oct. 1, 2008), pp. 326-330, XP031352199, ISBN: 978-1-4244-1947-0.
International Search Report and Written Opinion—PCT/US2009/063856, International Search Authority—European Patent Office—Oct. 18, 2010.
Taiwan Search Report—TW098138475—TIPO—Jul. 25, 2012.

* cited by examiner

*Primary Examiner* — Nittaya Juntima
*Assistant Examiner* — Wanda Z Russell
(74) *Attorney, Agent, or Firm* — Tyler J. Overall

(57) ABSTRACT

Certain embodiments of the present disclosure provide a method for supporting multicast and broadcast services (MBS) with multiple-input multiple-output (MIMO) capabilities. This can be achieved by adding specific MIMO information into existing MBS-MAP messages while providing backward compatibility.

40 Claims, 11 Drawing Sheets

METHODS AND SYSTEMS FOR SUPPORTING MIMO BURSTS FOR MULTICAST AND BROADCAST SERVICES

CLAIM OF PRIORITY

This application claims the benefit of priority from U.S. Provisional Patent Application Ser. No. 61/114,451, entitled "METHODS AND SYSTEMS FOR SUPPORTING MIMO BURSTS FOR MULTICAST AND BROADCAST SERVICES" and filed Nov. 13, 2008, which is assigned to the assignee hereof and which is fully incorporated herein by reference for all purposes.

TECHNICAL FIELD

The present disclosure generally relates to wireless communication systems and more specifically to a method for supporting multicast and broadcast services with multiple-input multiple-output (MIMO) capabilities.

SUMMARY

Certain embodiments of the present disclosure provide a method for a wireless communication system with multicast and broadcast services (MBS). The method generally includes transmitting an MBS-MAP Information Element (IE) containing a first multiple-input multiple-output (MIMO) information identifying an MBS-MAP burst with a MIMO capability, transmitting the MBS-MAP burst containing a second MIMO information identifying an MBS data burst with a MIMO capability using one of a plurality of MIMO capabilities as specified by the first MIMO information, and transmitting the MBS data burst using one of a plurality of MIMO capabilities as specified by the second MIMO information.

Certain embodiments of the present disclosure provide a method for a wireless communication system with multicast and broadcast services (MBS). The method generally includes receiving an MBS-MAP Information Element (IE) containing a first multiple-input multiple-output (MIMO) information identifying an MBS-MAP burst with a MIMO capability, receiving and decoding the MBS-MAP burst containing a second MIMO information identifying an MBS data burst with a MIMO capability using one of a plurality of MIMO capabilities as specified by the first MIMO information, and receiving and decoding the MBS data burst using one of a plurality of MIMO capabilities as specified by the second MIMO information.

Certain embodiments of the present disclosure provide an apparatus for a wireless communication system with multicast and broadcast services (MBS). The apparatus generally includes logic for transmitting an MBS-MAP Information Element (IE) containing a first multiple-input multiple-output (MIMO) information identifying an MBS-MAP burst with a MIMO capability, logic for transmitting the MBS-MAP burst containing a second MIMO information identifying an MBS data burst with a MIMO capability using one of a plurality of MIMO capabilities as specified by the first MIMO information, and logic for transmitting the MBS data burst using one of a plurality of MIMO capabilities as specified by the second MIMO information.

Certain embodiments of the present disclosure provide an apparatus for a wireless communication system with multicast and broadcast services (MBS). The apparatus generally includes logic for receiving an MBS-MAP Information Element (IE) containing a first multiple-input multiple-output (MIMO) information identifying an MBS-MAP burst with a MIMO capability, logic for receiving and decoding the MBS-MAP burst containing a second MIMO information identifying an MBS data burst with a MIMO capability using one of a plurality of MIMO capabilities as specified by the first MIMO information, and logic for receiving and decoding the MBS data burst using one of a plurality of MIMO capabilities as specified by the second MIMO information.

Certain embodiments of the present disclosure provide an apparatus for a wireless communication system with multicast and broadcast services (MBS). The apparatus generally includes means for transmitting an MBS-MAP Information Element (IE) containing a first multiple-input multiple-output (MIMO) information identifying an MBS-MAP burst with a MIMO capability, means for transmitting the MBS-MAP burst containing a second MIMO information identifying an MBS data burst with a MIMO capability using one of a plurality of MIMO capabilities as specified by the first MIMO information, and means for transmitting the MBS data burst using one of a plurality of MIMO capabilities as specified by the second MIMO information.

Certain embodiments of the present disclosure provide an apparatus for a wireless communication system with multicast and broadcast services (MBS). The apparatus generally includes means for receiving an MBS-MAP Information Element (IE) containing a first multiple-input multiple-output (MIMO) information identifying an MBS-MAP burst with a MIMO capability, means for receiving and decoding the MBS-MAP burst containing a second MIMO information identifying an MBS data burst with a MIMO capability using one of a plurality of MIMO capabilities as specified by the first MIMO information, and means for receiving and decoding the MBS data burst using one of a plurality of MIMO capabilities as specified by the second MIMO information.

Certain embodiments of the present disclosure provide a computer-program product for a wireless communication system with multicast and broadcast services (MBS), comprising a computer readable medium having instructions stored thereon, the instructions being executable by one or more processors. The instructions generally include instructions for transmitting an MBS-MAP Information Element (IE) containing a first multiple-input multiple-output (MIMO) information identifying an MBS-MAP burst with a MIMO capability, instructions for transmitting the MBS-MAP burst containing a second MIMO information identifying an MBS data burst with a MIMO capability using one of a plurality of MIMO capabilities as specified by the first MIMO information, and instructions for transmitting the MBS data burst using one of a plurality of MIMO capabilities as specified by the second MIMO information.

Certain embodiments of the present disclosure provide a computer-program product for a wireless communication system with multicast and broadcast services (MBS), comprising a computer readable medium having instructions stored thereon, the instructions being executable by one or more processors. The instructions generally include instructions for receiving an MBS-MAP Information Element (IE) containing a first multiple-input multiple-output (MIMO) information identifying an MBS-MAP burst with a MIMO capability, instructions for receiving and decoding the MBS-MAP burst containing a second MIMO information identifying an MBS data burst with a MIMO capability using one of a plurality of MIMO capabilities as specified by the first MIMO information, and instructions for receiving and decoding the MBS data burst using one of a plurality of MIMO capabilities as specified by the second MIMO information.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
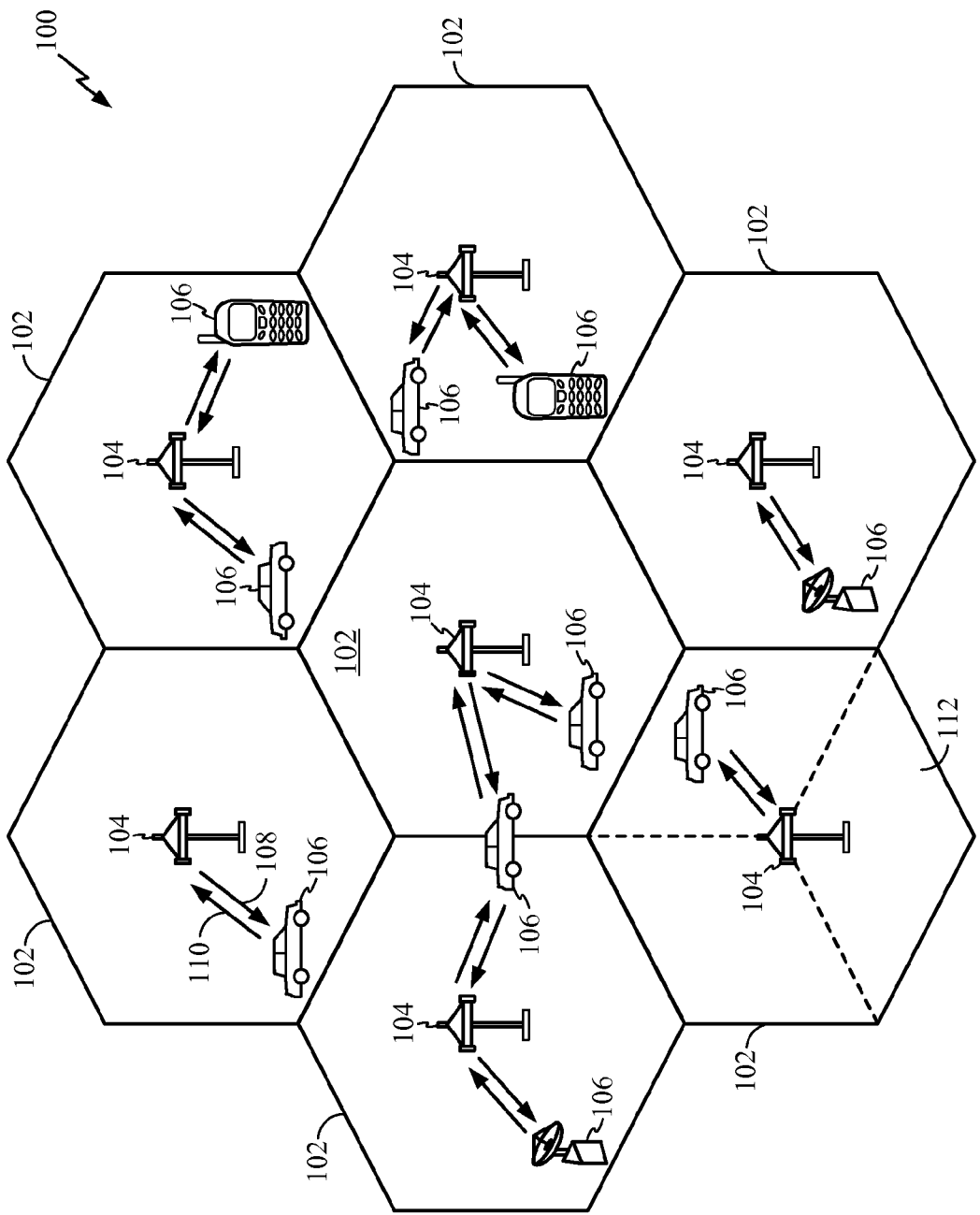
FIG. 1 illustrates an example wireless communication system, in accordance with certain embodiments of the present disclosure.

The word "exemplary" is used herein to mean "serving as an example, instance, or illustration." Any embodiment described herein as "exemplary" is not necessarily to be construed as preferred or advantageous over other embodiments.

Multicast and broadcast services (MBS) provide an efficient method for concurrent transport of data common to a group of users (e.g. mobile stations), which can be achieved by utilizing a common multicast connection identifier (CID).

The MBS services can be offered only in a downlink (i.e, in a transmission link from a serving base station to a served mobile station) and may be coordinated and synchronized among a group of base stations in order to allow a macro-diversity.

Current IEEE (Institute of Electrical and Electronics Engineers) 802.16 standards specify only normal burst allocation for the MBS, which assumes that only one antenna is employed at the serving base station, as well as at every served mobile station. However, it is well known in that an improvement in quality and capacity of data transmission can be achieved by utilizing multiple antennas at both sides of communication link.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. The standards define at least four different physical layers (PHYs) and one medium access control (MAC) layer. The OFDM and OFDMA physical layer of the four physical layers are the most popular in the fixed and mobile BWA areas respectively.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
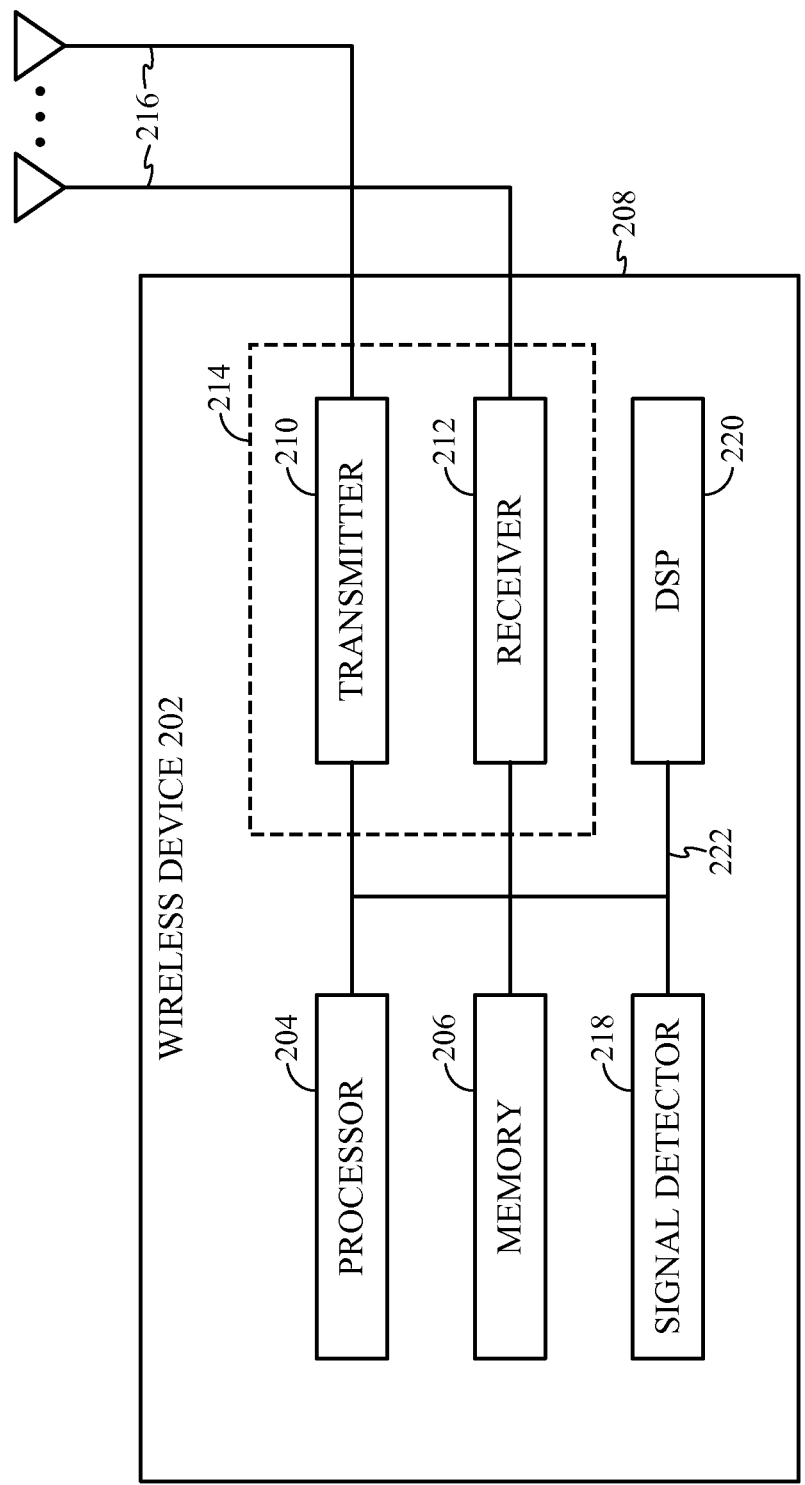
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. A single or a plurality of transmit antennas 216 may be attached to the housing 208 and electrically coupled to the transceiver 214. The wireless device 202 may also include (not shown) multiple transmitters, multiple receivers, and multiple transceivers.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
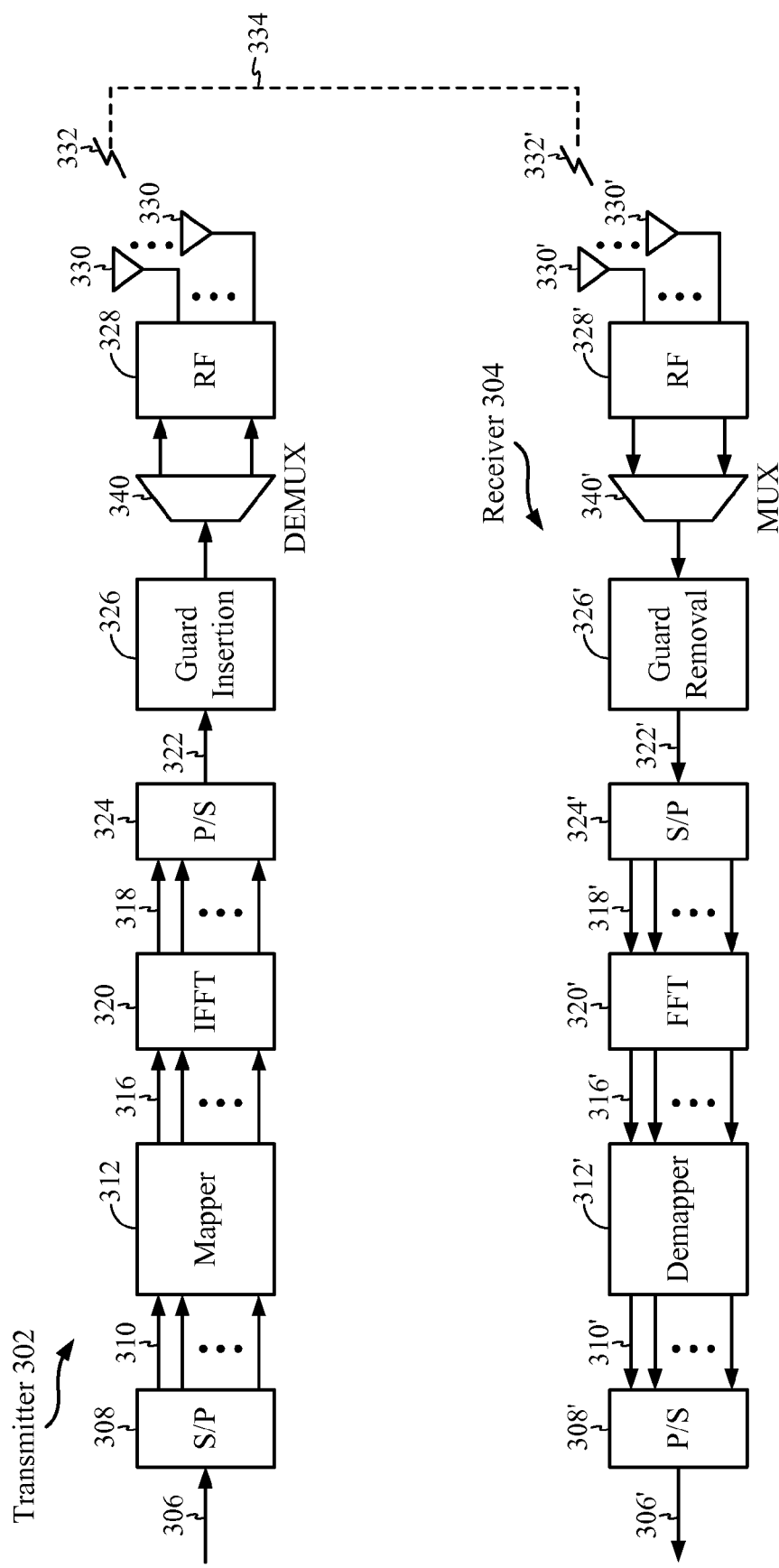
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into M parallel data streams 310.

The M parallel data streams 310 may then be provided as input to a mapper 312. The mapper 312 may map the M parallel data streams 310 onto M constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output M parallel symbol streams 316, each symbol stream 316 corresponding to one of the M orthogonal subcarriers of the inverse fast Fourier transform (IFFT) 320. These M parallel symbol streams 316 are represented in the frequency domain and may be converted into M parallel time domain sample streams 318 by an IFFT component 320.

A brief note about terminology will now be provided. M parallel modulations in the frequency domain are equal to M modulation symbols in the frequency domain, which are equal to M mapping and M-point IFFT in the frequency domain, which is equal to one (useful) OFDM symbol in the time domain, which is equal to M samples in the time domain. One OFDM symbol in the time domain, NS, is equal to NCP (the number of guard samples per OFDM symbol)+M (the number of useful samples per OFDM symbol).

The M parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The signal from the guard insertion component 326 may then be input into demultiplexer 340 to generate different data streams for a plurality of transmit antennas (or equivalently, spatial subchannels). After that, the base-band data stream for each antenna can be upconverted to a desired transmit frequency band by a radio frequency (RF) front end 328, and the antenna array 330 may then transmit the resulting signal 332 across multiple spatial subchannels 334.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a plurality of spatial subchannels 334. When a signal 332' is received by the antenna array 330', the received signal 332' may be downconverted to a baseband signal by an RF front end 328' and converted into a single stream by multiplexer 340'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the M parallel time-domain symbol streams 318', each of which corresponds to one of the M orthogonal subcarriers. A fast Fourier transform (FFT) component 320' may convert the M parallel time-domain symbol streams 318' into the frequency domain and output M parallel frequency-domain symbol streams 316'.

A demapper 312' may perform the inverse of the symbol mapping operation that was performed by the mapper 312 thereby outputting M parallel data streams 310'. A P/S converter 308' may combine the M parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 350'.

Exemplary Multicast and Broadcast Services

Multicast and broadcast services (MBS) provide an efficient technique for concurrent transport of data that are common to a group of user terminals (e.g., mobile stations) by utilizing a common multicast connection identifier (CID). The MBS feature may be available only in a downlink and may be coordinated and synchronized among a group of base stations in order to allow a macro-diversity.

An MBS zone may comprise one or more base stations, and it may be identified by a unique MBS zone identifier (ID). A single BS may be associated with one or multiple MBS zones. Multicast and broadcast data transmitted over the MBS zone may have the same CID and the same Security Association identifier (SAID) (i.e. the same encryption scheme).

Figure 4:
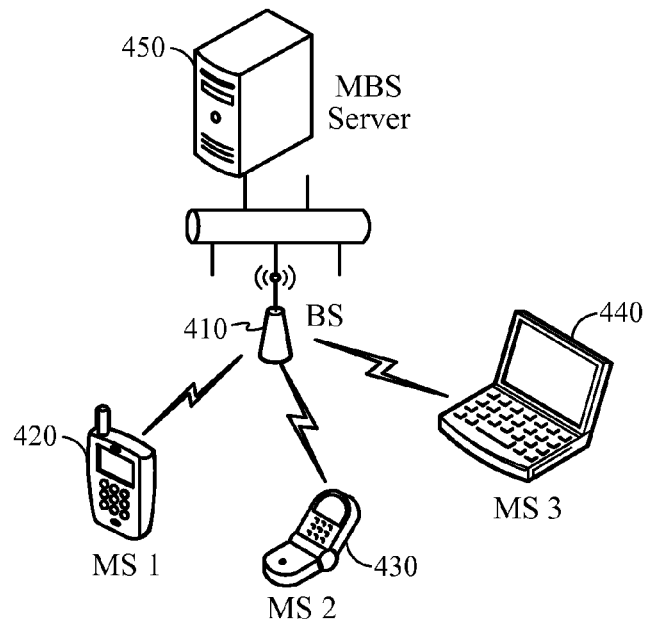
FIG. 4 illustrates a single-base-station access to a plurality of mobile stations for multicast and broadcast services (MBS) in accordance with certain embodiments of the present disclosure.

FIG. 4 illustrates a single-base-station (a single-BS) access to a plurality of mobile stations for MBS. The serving BS 410 may transmit the MBS data to the plurality of mobile stations, such as mobile stations 420, 430 and 440. The MBS server 450 may control operations that are performed by the serving BS 410. In this particular case of the single-BS access, any available traffic connection identifier (CID) can be utilized.

Figure 5:
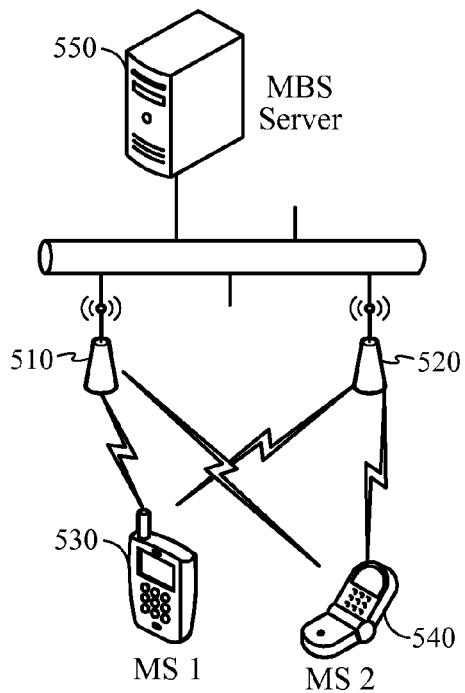
FIG. 5 illustrates a multi-base-station access to a plurality of mobile stations for MBS in accordance with certain embodiments of the present disclosure.

FIG. 5 illustrates a multi-BS access to a plurality of mobile stations for MBS. Both serving base stations 510 and 520 may transmit the MBS data to same mobile stations, such as mobile stations 530 and 540. A common MBS server 550 may control operations performed by both base stations 510 and 520. In this particular case of the multi-BS access, only a multicast CID may be utilized.

Figure 6:
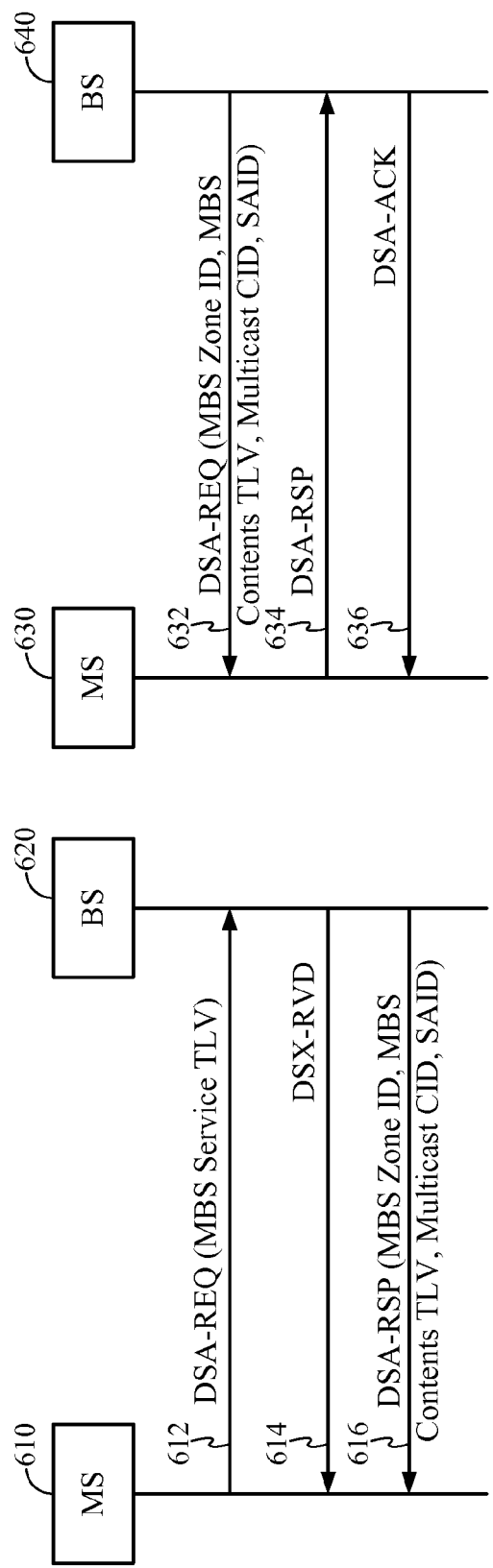
FIG. 6 illustrates examples of exchanging messages between a base station and a mobile station for establishing an MBS connection in accordance with certain embodiments of the present disclosure.

FIG. 6 illustrates examples of exchanging messages between a serving BS and a served MS for establishing an MBS connection between these two communication entities. According to certain embodiments, either a served MS 610 or a serving BS 640 may initiate a setup of the MBS connection.

As illustrated in FIG. 6, the MS 610 may request the MBS service by sending a Dynamic Service Addition Request (DSA-REQ) message 612 to the BS 620. The DSA-REQ message may include an MBS Service Type-Length-Value (TLV) field specifying a type of the MBS service (e.g., a single-BS access MBS service or a multi-BS access MBS service). The serving BS 620 may respond to the served MS 610 with a Dynamic Service Received (DSX-RVD) message 614, and then the BS 620 may transmit a Dynamic Service Addition Response (DSA-RSP) message 616 to the MS 610. The DSA-RSP message 616 may include: an MBS zone ID, an MBS Contents Type-Length-Value (TLV) field comprising a plurality of vendor-defined content IDs on the same multicast connection, a multicast CID, and an SAID.

On the other hand, as illustrated in FIG. 6, the BS 640 may initiate the MBS service by sending the DSA-REQ message 632 to the served MS 630. As mentioned above, the DSA-REQ message 632 may include: the MBS zone ID, the MBS Contents TLV field, the multicast CID, and the SAID. The MS 630 may respond to the serving BS 640 by sending the DSA-RSP message 634. Once the BS 640 receives the DSA-RSP message, the BS 640 may send a Dynamic Service Addition Acknowledge (DSA-ACK) message 636 to the MS 630 confirming that the MBS connection is successfully established.

Exemplary Support of MBS Support of MBS Bursts with MIMO Capabilities

Current IEEE 802.16 standards specify only normal allocation of MBS bursts, which assumes that only one antenna is employed at a serving BS and at every active MS. According to certain embodiments of the present disclosure, however, an MBS zone is proposed that may support MBS bursts with MIMO capabilities for the purpose of improving quality and capacity of data transmissions. This may be achieved, for example, by adding specific MIMO information into existing MBS-MAP messages while providing backward compatibility.

Figure 7:
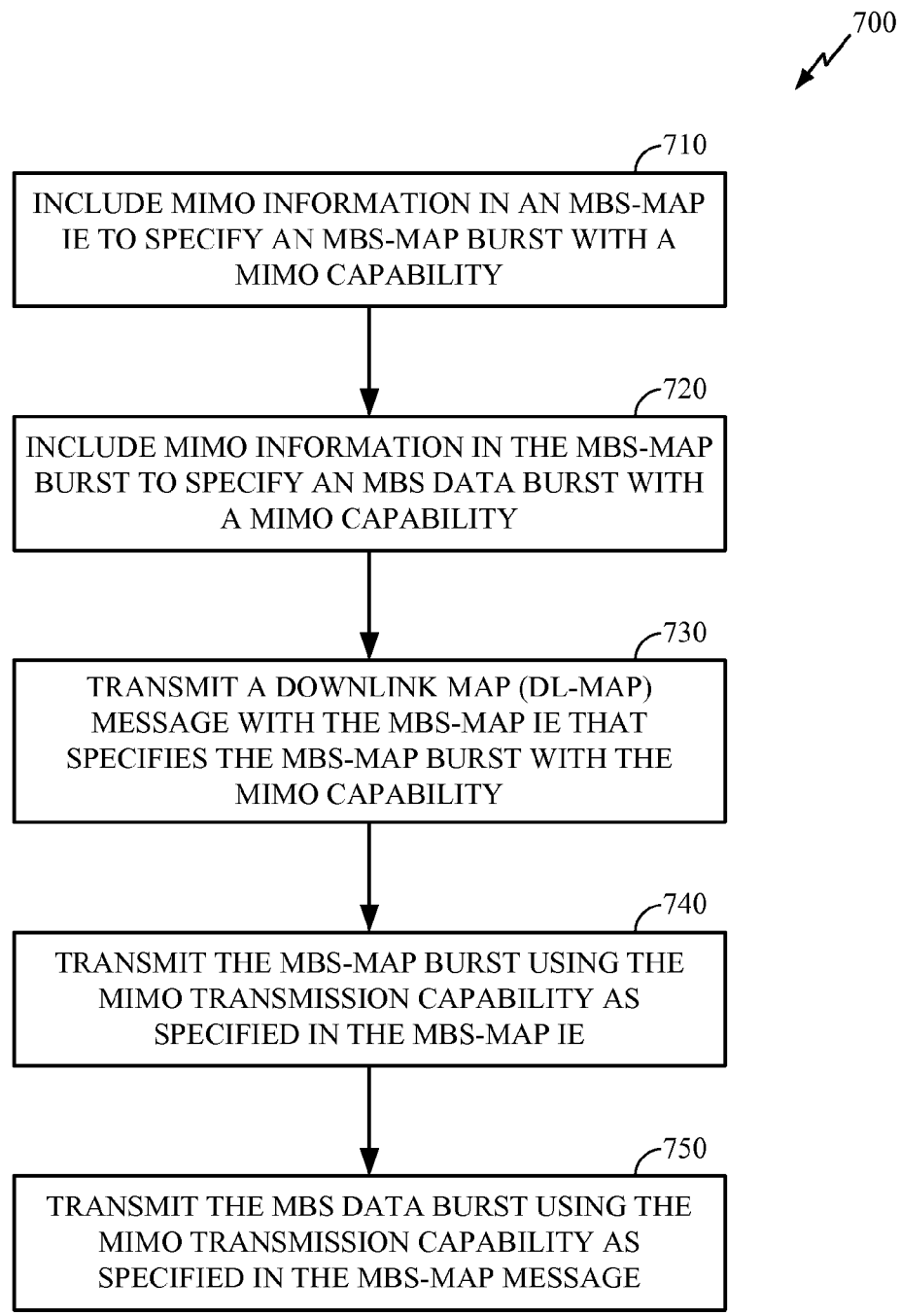
FIG. 7 illustrates example operations for supporting MBS bursts with multiple-input multiple-output (MIMO) capabilities in accordance with certain embodiments of the present disclosure.
Figure 8:
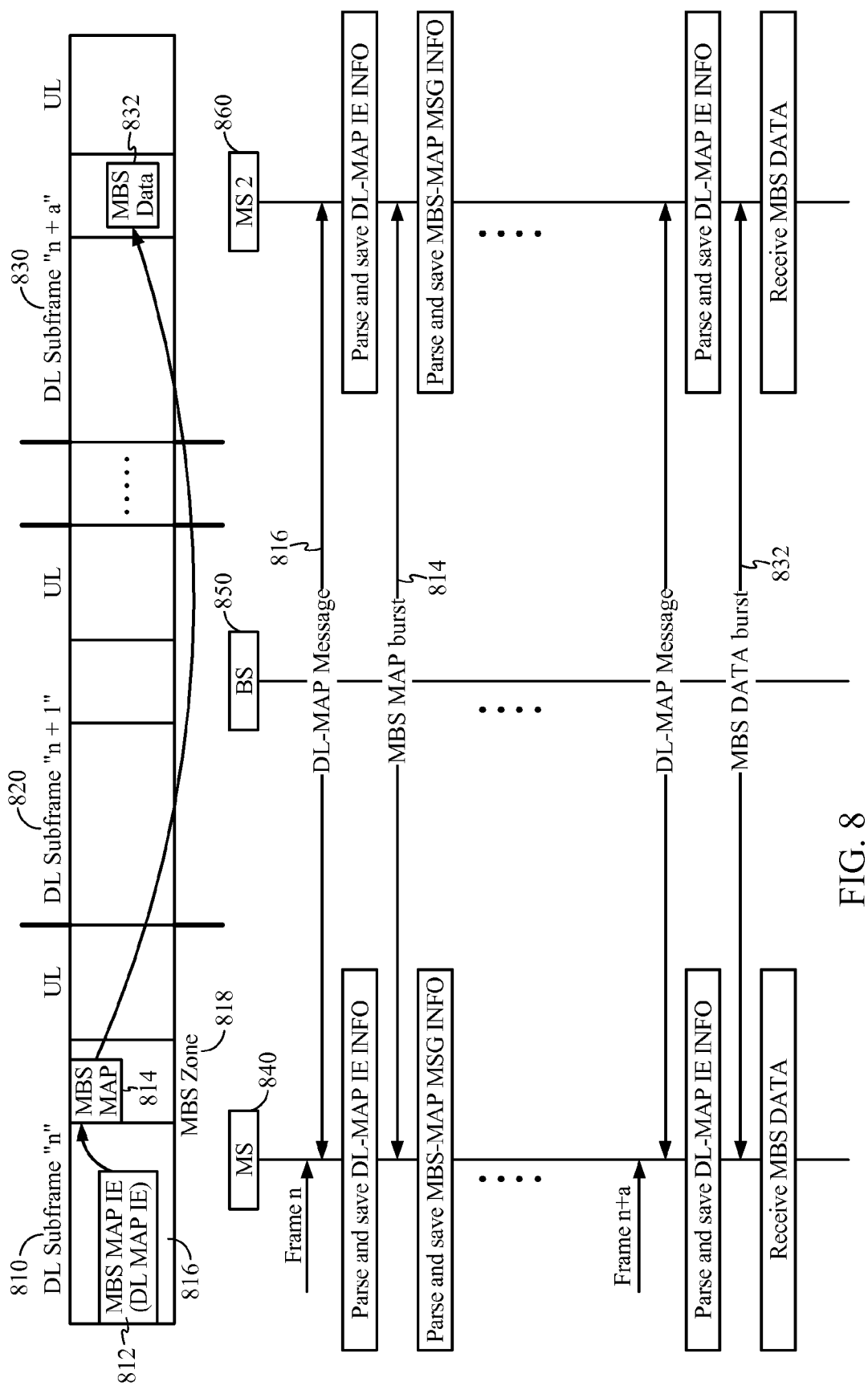
FIG. 8 illustrates a procedure for the MBS MIMO burst transmission and decoding in accordance with certain embodiments of the present disclosure.

FIG. 7 illustrates example operations for supporting MBS bursts with MIMO capability in accordance with certain embodiments of the present disclosure. FIG. 8 illustrates a procedure for the MBS MIMO burst transmission and decoding. It can be assumed, without loss of generality, that an MBS communication is performed in FIG. 8 between one serving BS and two served mobile stations.

At 710, the serving BS may include specific MIMO information in an MBS-MAP Information Element (IE) 812 in order to specify an MBS-MAP burst 814 with a MIMO capability. For example, a the MBS-MAP IE may include a "MIMO Indication" field that indicates if the MIMO capability is enabled. For certain embodiments of the present disclosure, the specific MIMO information may comprise at least one of: a MIMO matrix type, a type of spatial processing, and a number of layers in the wireless system.

As illustrated in FIG. 8, the MBS-MAP IE 812 may be included in a downlink MAP (DL-MAP) message 816. Within the DL-MAP message, the BS may also transmit a Downlink Interval Usage Code (DIUC) field with value of 14 along with the MBS-MAP IE in order to indicate when the next MBS data burst will be transmitted. The offset value, which may be included in the MBS-MAP IE 812, may be associated with a channel identifier (CID) value. The specified offset value may indicate a frame number in which the next MBS data will be transmitted. The MBS-MAP message allocation parameters may be included in the MBS-MAP IE at regular intervals, and also when the MBS-MAP message allocation parameters are modified.

At 720, the BS may include MIMO information (e.g., the MIMO matrix type, the type of spatial processing, and the number of layers in the system) within the MBS-MAP burst 814 in order to specify an MBS data burst 832 with a MIMO capability. The MIMO information included in the MBS-MAP burst 814 may be same or different from the MIMO information included in the MBS-MAP IE 812.

The MBS-MAP message 814 may be located at the first sub-channel and at the first OFDMA symbol of the MBS zone, which is specified by the MBS-MAP IE when the field "Macro diversity enhanced" is set to 1. The MBS zone 818 may be located in the same frame 810 as the MBS-MAP IE 812 that specifies it. Location of the MBS zone within the frame may be specified by the field "OFDMA Symbol Offset" within the MBS-MAP IE.

At 730, the BS 850 may transmit the DL-MAP message 816 to mobile stations 840 and 860. The DL-MAP message may comprise the MBS-MAP IE 812 that specifies the MBS-MAP burst 814 with MIMO capability. Upon reception of the DL-MAP message, mobile stations 840 and 860 may parse and save information contained within the MBS-MAP IE 812.

At 740, the BS 850 may transmit to mobile stations 840 and 860 the MBS-MAP message 814 using MIMO transmission capability specified in the MBS-MAP IE 812. The BS 850 may send the MBS-MAP message 814 on the broadcast CID in order to specify a location and size of multi-BS MBS data bursts. Upon reception of the MBS MAP burst, mobile stations 840 and 860 may parse and save information contained within the MBS-MAP message 814.

The MBS data bursts may be located inside frames that will be transmitted certain number of frames in the future from a frame containing the MBS-MAP message. As illustrated in FIG. 8, the MBS-MAP message 814 may be located within the nth DL sub-frame 810, and this message may identify the MBS data burst 832 that is located in the (n+a)th sub-frame 830, where a is any positive integer number.

If present, the MBS-MAP message may be located at the first symbol and at the first sub-channel of the MBS zone. Several frames after sending the MBS-MAP burst, at 750, the BS 850 may transmit to mobile stations the MBS data burst 832 using MIMO transmission capability specified within the MBS-MAP message 814. Based on information from the previously received MBS-MAP message 814, mobile stations may receive and decode MBS data burst 832 by employing a plurality of antennas and by applying an appropriate MIMO decoding algorithm.

The MBS-MAP burst may include at least one MBS DATA IE, or at least one Extended MBS DATA IE, or at least one MBS DATA Time Diversity IE, which may define access information and allocation parameters for the MBS data burst. For certain embodiments of the present disclosure, the MBS DATA IE and the Extended MBS DATA IE may allocate the MBS data burst by specifying: MIMO information parameters such as a type of spatial processing and a number of utilized antennas (defined by "Space Time Coding" and "Matrix Indicator" fields), a starting location (defined by "Symbol Offset" and "Sub-channel Offset" fields), a size (defined by "No. Symbols" and "No. Sub-channels" fields), a modulation coding scheme (defined by the DIUC and "Repetition Coding" fields), multicast CID(s) and logical channel ID(s) of the MBS data burst.

Beside fields that specify a type of supported MIMO system, the MBS DATA Time Diversity IE may comprise some additional fields related to the MIMO MBS data burst: an Automatic repeat-request Identifier Sequence Number (AISN) field, a Service Profile Identifier (SPID) field, an Automatic repeat-request Channel Identifier (ACID) field, an Encoder Packet size (i.e., N_EP field), and a field that specifies a number of sub-channels (i.e., N_SCH field). The MBS DATA Time Diversity IE may be present only for the MBS services with a hybrid automatic repeat-request enabled (HARQ-enabled) MS. The MBS data burst indicated by the MBS DATA Time Diversity IE may be encoded by using a typical HARQ encoding approach. In this particular case, the MBS data burst may not need an acknowledgement from the MS. The MBS-MAP burst may always start from the first symbol and from the first sub-channel of the MBS zone.

Exemplary Possible Advantages of MBS Bursts with MIMO Capabilities

The MIMO technique exploits the use of multiple signals transmitted into a wireless medium and multiple signals received from the wireless medium in order to improve performance of a wireless system. Consequently, the MIMO wireless system may utilize a wireless spectrum more efficiently than a single-input single-output (SISO) system providing either more reliable data transmission or increased data throughput.

Figure 9:
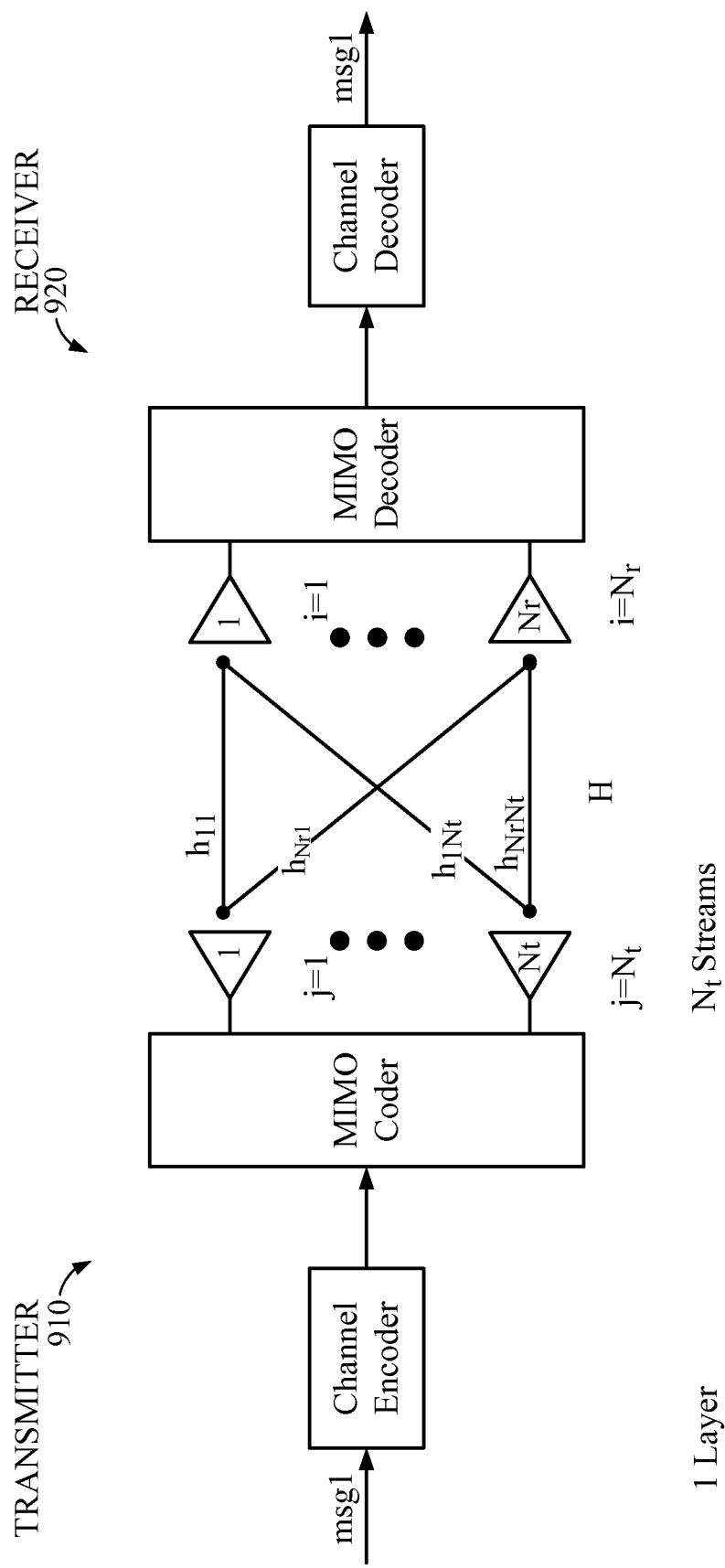
FIG. 9 illustrates an example block diagram of a vertically encoded MIMO system in accordance with certain embodiments of the present disclosure.
Figure 10:
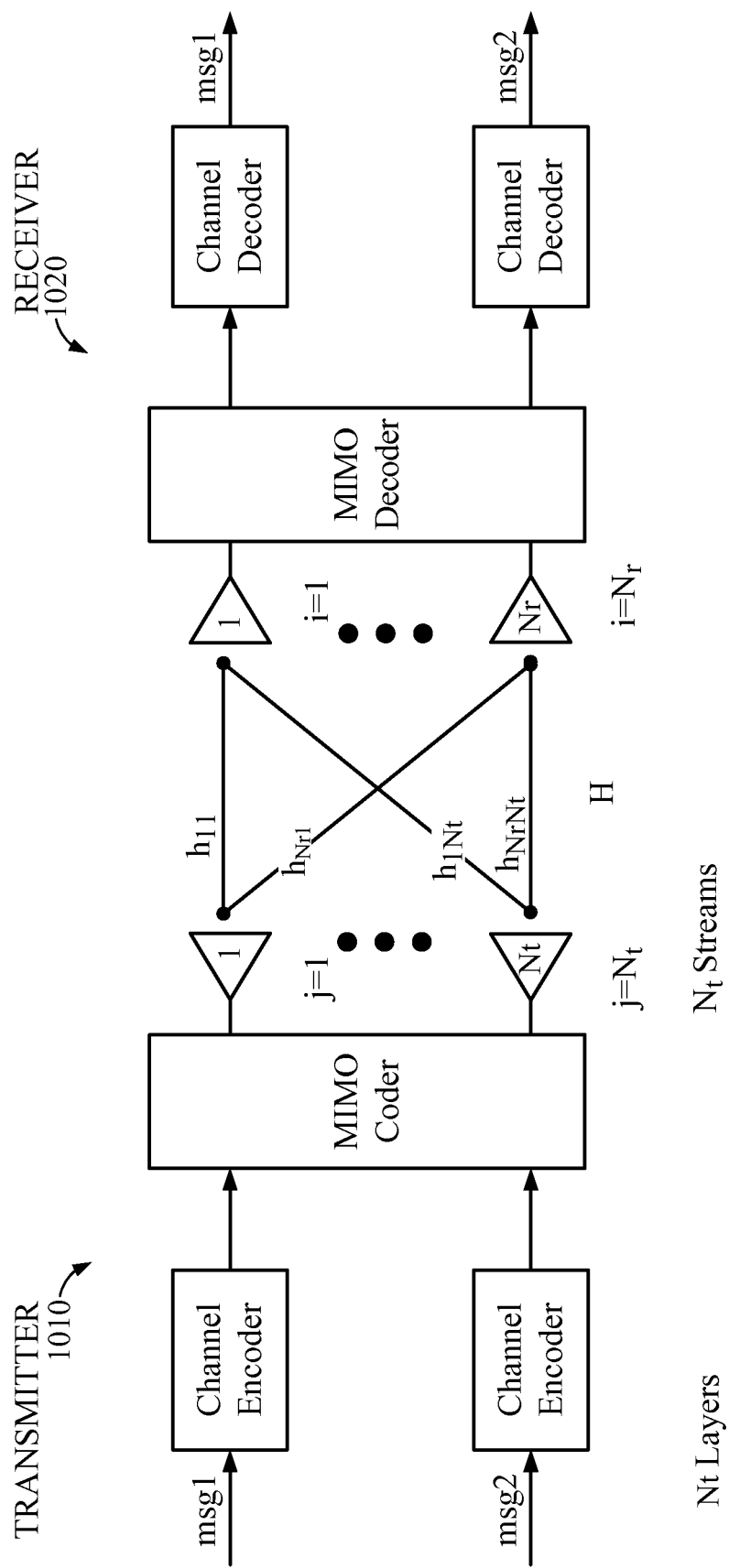
FIG. 10 illustrates an example block diagram of horizontally encoded MIMO system in accordance with certain embodiments of the present disclosure.

FIG. 9 illustrates an example block diagram of a system that can be either a vertically encoded MIMO system or a space time coded (STC) MIMO system. Because a transmit diversity may be employed at a transmitter 910, decoding performance may be improved at a receiver 920. FIG. 10 illustrates an example block diagram of a horizontally encoded MIMO system. Because multiple independent data streams may be simultaneously transmitted from a transmitter 1010, the incoming data rate at a receiver 1020 may be substantially increased. The example wireless system illustrated in FIG. 9 may support one layer, while the system illustrated in FIG. 10 may support up to $N_t$ layers, where $N_t$ is a number antennas implemented at the transmitter 1010.

For an exemplary case of WiMAX system with two transmit and two receive antennas, three types of MIMO transmissions may be defined related to FIG. 9 and FIG. 10. A vertically-encoded spatial multiplexing system illustrated in FIG. 9 may provide one layer and two independent data streams, and the transmission data rate may be twice higher compared to a single-input single-output (SISO) system. A horizontally-encoded spatial multiplexing system illustrated in FIG. 10 may provide two layers and two independent data streams, and the transmission data rate may be doubled compared to the SISO system. A space time coding (STC) MIMO system illustrated in FIG. 9 may support one layer and two spatially encoded data streams. The transmission data rate of the STC MIMO system may be the same as that of the SISO system, but the STC technique may provide increased reliability by exploiting a transmit diversity.

Another valuable benefit of MIMO technology is a Spatial Division Multiplexing (SDM). The SDM technique spatially multiplexes multiple independent data streams (i.e., virtual channels) simultaneously within one spectral channel. In fact, multiple antennas may transmit in parallel different flows of individually encoded signals (spatial streams) in order to transmit a larger amount of data through a given channel bandwidth. At the receiver end, each antenna may receive a different mix of signal streams, and a stream dedicated to the particular receive antenna can be successfully demultiplexed because of the SDM applied at the transmitter. The MIMO SDM may significantly increase data throughput as the number of resolved spatial data streams increases. Each spatial stream may require its own transmit/receive antenna pair at each end of the transmission.

It can be concluded from the previous analysis that substantial advantages may be possible over the non-MIMO MBS if MIMO capabilities are supported in the MBS zone. The MIMO-supported MBS may provide increased data rate or throughput on the same amount of frequency resources. Therefore, the MIMO-supported MBS may support twice more MBS channels over the non-MIMO MBS for the exemplary case of two transmit antennas at a serving BS and two antennas at each mobile station. Equivalently, the MIMO-supported MBS may reduce half of frequency resources over the non-MIMO MBS, while providing the same MBS channels as the non-MIMO MBS for the exemplary case of two antennas at the serving BS and two antennas at each mobile station. Furthermore, the MIMO-supported MBS may achieve increased reliability on the same amount of frequency resources by using transmit diversity (such as the wireless system illustrated in FIG. 9). As a result, the system may provide higher quality services.

Exemplary Grouping for MIMO-Supported and Non-MIMO Supported MBS

Figure 11:
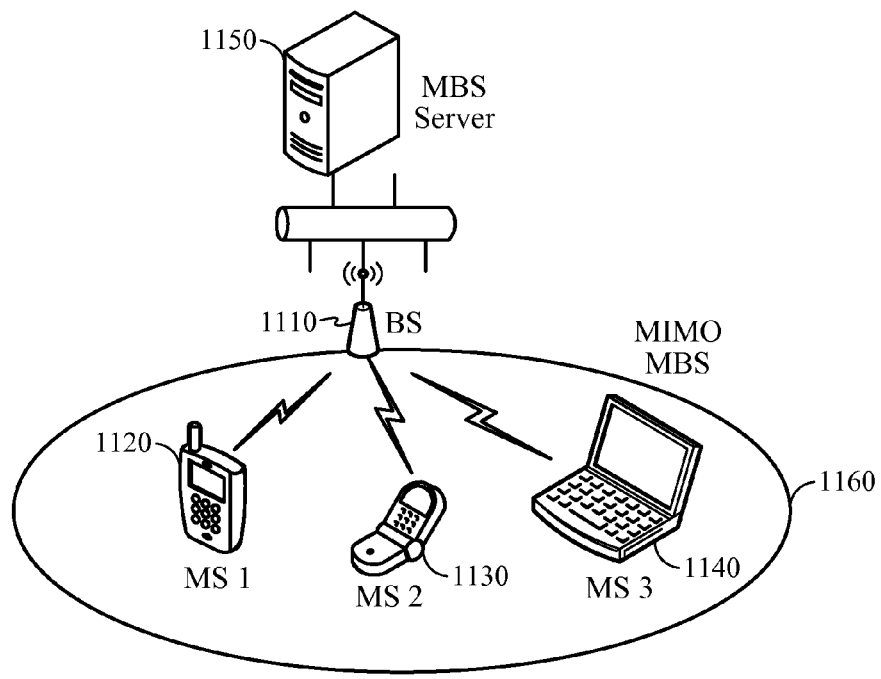
FIG. 11 illustrates a MIMO MBS grouping of mobile stations in accordance with certain embodiments of the present disclosure.

Certain embodiments of the present disclosure support an MBS grouping for achieving efficient MIMO multicast and broadcast services. FIG. 11 illustrates an example of MIMO MBS grouping of mobile stations. All illustrated mobile stations 1120, 1130 and 1140 may support the MIMO MBS communication with the serving BS 1110. The MBS server 1150 may control operations performed by the BS 1110. The serving BS may send the MIMO MBS data to all grouped subscribers in order to improve transmission capacity and to increase reliability of data, while a common CID can be utilized for all subscribers within the MIMO MBS group 1160.

Figure 12:
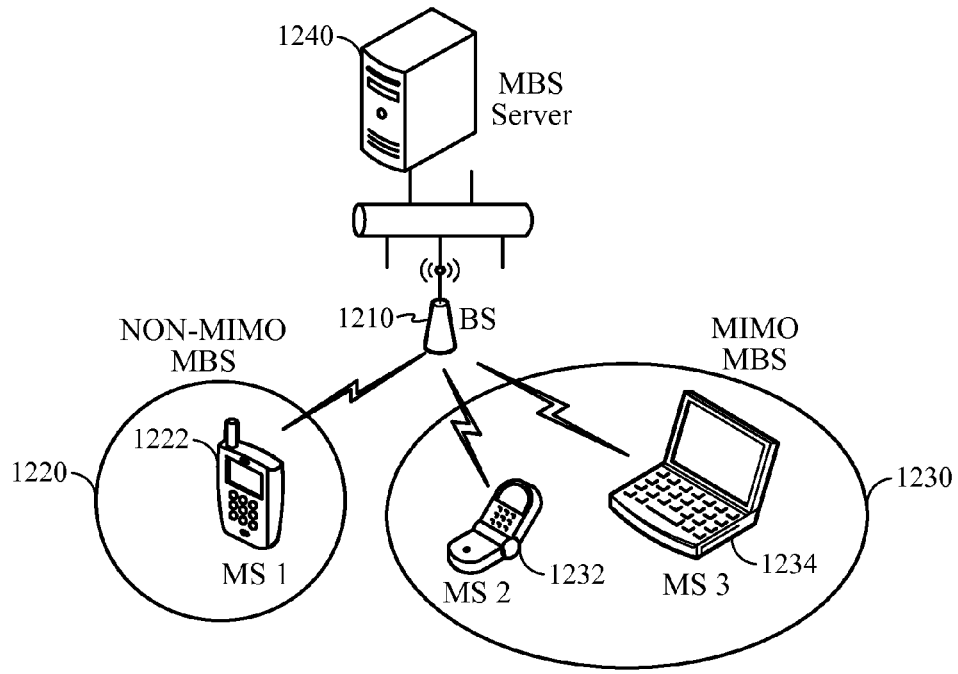
FIG. 12 illustrates a MIMO MBS grouping and a non-MIMO MBS grouping of mobile stations in accordance with certain embodiments of the present disclosure.

FIG. 12 illustrates a combination of a non-MIMO MBS group 1220 and a MIMO-supported MBS group 1230. A single serving BS 1210 may support two different MBS groupings: one for sending the MIMO MBS data for improving transmission capacity and increasing data reliability, and another one for sending the non-MIMO MBS data. A mobile station 1222 from the non-MIMO MBS group 1220 may only support non-MIMO MBS data bursts. On the other hand, mobile stations 1232 and 1234 from the MIMO-supported MBS group 1230 may support MBS with MIMO capabilities. The MBS server 1240 may control operations performed by the serving BS 1210.

Figure 7A:
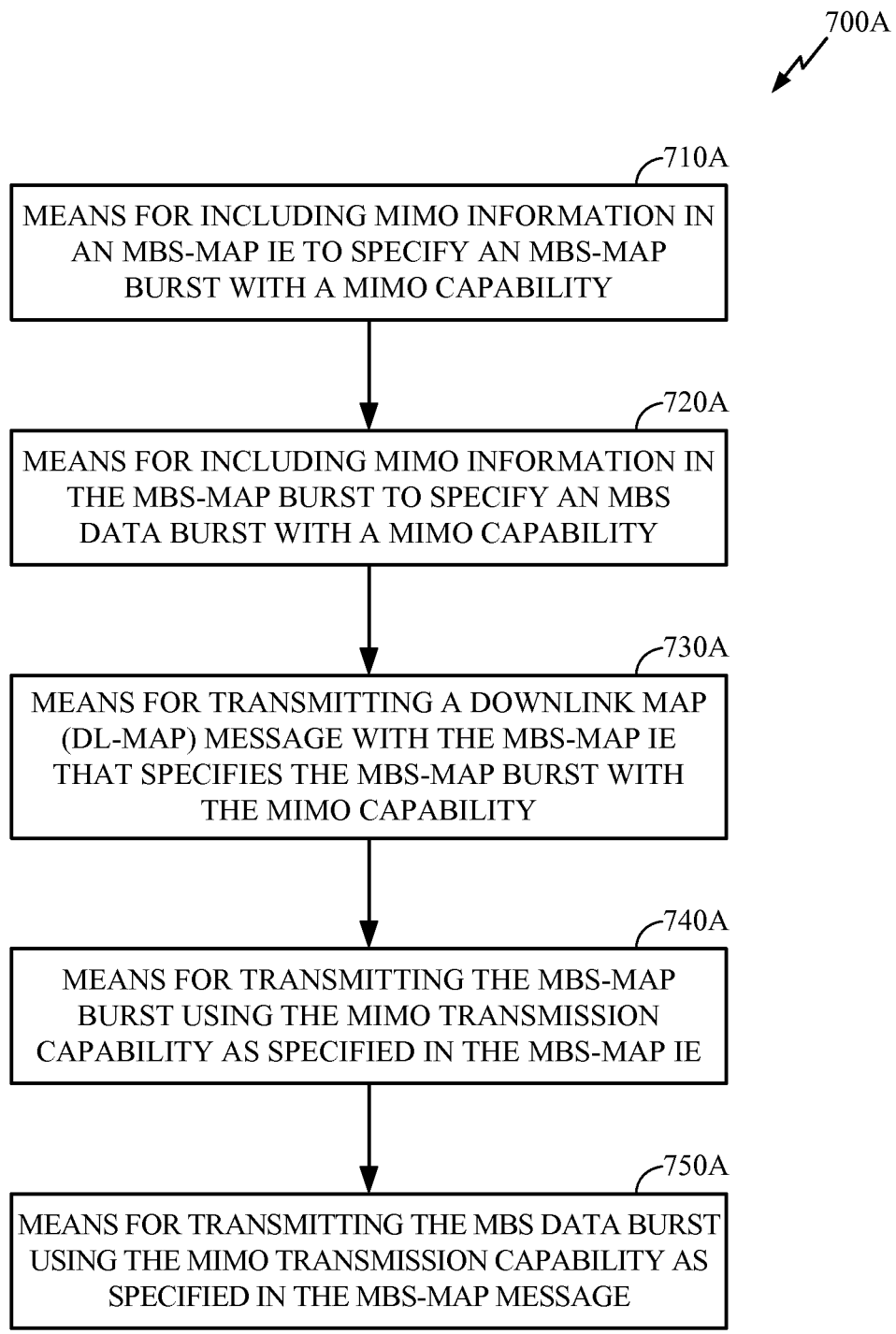
FIG. 7A illustrates example components capable of performing the operations illustrated in FIG. 7.

The various operations of methods described above may be performed by various hardware and/or software component(s) and/or module(s) corresponding to means-plus-function blocks illustrated in the Figures. For example, blocks 710-750 illustrated in FIG. 7 correspond to means-plus-function blocks 710A-750A illustrated in FIG. 7A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for a wireless communication system with multicast and broadcast services (MBS), comprising:
    transmitting a downlink MAP (DL-MAP) message, the DL-MAP message comprising an MBS-MAP Information Element (IE), wherein the MBS-MAP IE contains first multiple-input multiple-output (MIMO) information that identifies an MBS-MAP burst with at least one of a plurality of MIMO capabilities, wherein the plurality of MIMO capabilities comprise at least one of: a vertical spatial multiplexing, a horizontal spatial multiplexing, a space time coding, or a combination thereof;
    transmitting the MBS-MAP burst using the at least one of the plurality of MIMO capabilities specified by the first MIMO information, wherein the MBS-MAP burst contains second MIMO information that identifies an MBS data burst with at least one of the plurality of MIMO capabilities, wherein at least one of the first MIMO information or the second MIMO information comprises information specifying at least one of: a space time coding scheme, a type of channel matrix, a number of layers in the communication system, or a combination thereof; and
    transmitting the MBS data burst using the at least one of the plurality of MIMO capabilities specified by the second MIMO information.

2. The method of claim 1, wherein the first MIMO information and the second MIMO information are different.

3. The method of claim 1, wherein the MBS-MAP burst with the second MIMO information comprises at least one of: an MBS DATA IE, an extended MBS DATA IE, and an MBS DATA Time Diversity IE.

4. The method of claim 1, further comprising:
grouping a plurality of mobile stations that support MIMO MBS data bursts into a MIMO-supported MBS group with a common first multicast connection identifier (CID);
grouping a plurality of mobile stations that do not support MIMO MBS data bursts into a non-MIMO MBS group with a common second multicast CID different than the common first multicast CID; and
simultaneously transmitting MIMO MBS data burst for the MIMO-supported MBS group and non-MIMO data burst for the non-MIMO MBS group.

5. A method for a wireless communication system with multicast and broadcast services (MBS), comprising:
receiving a downlink MAP (DL-MAP) message, the DL-MAP message comprising an MBS-MAP Information Element (IE), wherein the MBS-MAP IE contains first multiple-input multiple-output (MIMO) information that identifies an MBS-MAP burst with at least one of a plurality of MIMO capabilities, wherein the plurality of MIMO capabilities comprise at least one of: a vertical spatial multiplexing, a horizontal spatial multiplexing, a space time coding, or a combination thereof;
receiving and decoding the MBS-MAP burst using the at least one of the plurality of MIMO capabilities specified by the first MIMO information, wherein the MBS-MAP contains second MIMO information that identifies an MBS data burst with at least one of the plurality of MIMO capabilities, wherein at least one of the first MIMO information or the second MIMO information comprises information specifying at least one of: a space time coding scheme, a type of channel matrix, a number of layers in the communication system, or a combination thereof; and
receiving and decoding the MBS data burst using the at least one of the plurality of MIMO capabilities specified by the second MIMO information.

6. The method of claim 5, wherein the first MIMO information and the second MIMO information are different.

7. The method of claim 5, wherein the MBS-MAP burst with the second MIMO information comprises at least one of: an MBS DATA IE, an extended MBS DATA IE, and an MBS DATA Time Diversity IE.

8. The method of claim 5, further comprising:
receiving and decoding MIMO MBS data bursts at a first communication entity that belongs to a first group of communication entities with a common first multicast connection identifier (CID), wherein the first group of communication entities supports the MBS data bursts with at least one of the plurality of MIMO capabilities; and
receiving and decoding non-MIMO MBS data bursts at a second communication entity that belongs to a second group of communication entities with a common second multicast CID, wherein the second group of communication entities does not support the MBS data bursts with any of the plurality of MIMO capabilities, and wherein the common first multicast CID is different from the common second multicast CID.

9. The method of claim 8, wherein the first communication entity or the second communication entity is a mobile station served by a base station.

10. The method of claim 8, wherein the first group of communication entities or the second group of communication entities comprises a group of mobile stations served by a common base station.

11. An apparatus for a wireless communication system with multicast and broadcast services (MBS), comprising:
logic for transmitting a downlink MAP (DL-MAP) message, the DL-MAP message comprising an MBS-MAP Information Element (IE), wherein the MBS-MAP IE contains first multiple-input multiple-output (MIMO) information that identifies an MBS-MAP burst with at least one of a plurality of MIMO capabilities, wherein the plurality of MIMO capabilities comprise at least one of: a vertical spatial multiplexing, a horizontal spatial multiplexing, a space time coding, or a combination thereof;
logic for transmitting the MBS-MAP burst using the at least one of the plurality of MIMO capabilities specified by the first MIMO information, wherein the MBS-MAP burst contains second MIMO information that identifies an MBS data burst with at least one of the plurality of MIMO capabilities, wherein at least one of the first MIMO information or the second MIMO information comprises information specifying at least one of: a space time coding scheme, a type of channel matrix, a number of layers in the communication system, or a combination thereof; and
logic for transmitting the MBS data burst using the at least one of the plurality of MIMO capabilities specified by the second MIMO information.

12. The apparatus of claim 11, wherein the first MIMO information and the second MIMO information are different.

13. The apparatus of claim 11, wherein the MBS-MAP burst with the second MIMO information comprises at least one of: an MBS DATA IE, an extended MBS DATA IE, and an MBS DATA Time Diversity IE.

14. The apparatus of claim 11, further comprising:
logic for grouping a plurality of mobile stations that support MIMO MBS data bursts into a MIMO-supported MBS group with a common first multicast connection identifier (CID);
logic for grouping a plurality of mobile stations that do not support MIMO MBS data bursts into a non-MIMO MBS group with a common second multicast CID different than the common first multicast CID; and logic for simultaneously transmitting MIMO MBS data burst for the MIMO-supported MBS group and non-MIMO data burst for the non-MIMO MBS group.

15. An apparatus for a wireless communication system with multicast and broadcast services (MBS), comprising:
logic for receiving a downlink MAP (DL-MAP) message, the DL-MAP message comprising an MBS-MAP Information Element (IE), wherein the MBS-MAP IE contains first multiple-input multiple-output (MIMO) information that identifies an MBS-MAP burst with at least one of a plurality of MIMO capabilities, wherein the plurality of MIMO capabilities comprise at least one of: a vertical spatial multiplexing, a horizontal spatial multiplexing, a space time coding, or a combination thereof;
logic for receiving and decoding the MBS-MAP burst using the at least one of the plurality of MIMO capabilities specified by the first MIMO information, wherein the MBS-MAP contains second MIMO information that identifies an MBS data burst with at least one of the plurality of MIMO capabilities, wherein at least one of the first MIMO information or the second MIMO information comprises information specifying at least one of: a space time coding scheme, a type of channel matrix, a number of layers in the communication system, or a combination thereof; and logic for receiving and decoding the MBS data burst using the at least one of the plurality of MIMO capabilities specified by the second MIMO information.

16. The apparatus of claim 15, wherein the first MIMO information and the second MIMO information are different.

17. The apparatus of claim 15, wherein the MBS-MAP burst with the second MIMO information comprises at least one of: an MBS DATA IE, an extended MBS DATA IE, and an MBS DATA Time Diversity IE.

18. The apparatus of claim 15, further comprising:
logic for receiving and decoding MIMO MBS data bursts at a first communication entity that belongs to a first group of communication entities with a common first multicast connection identifier (CID), wherein the first group of communication entities supports the MBS data bursts with at least one of the plurality of MIMO capabilities; and logic for receiving and decoding non-MIMO MBS data bursts at a second communication entity that belongs to a second group of communication entities with a common second multicast CID, wherein the second group of communication entities does not support the MBS data bursts with any of the plurality of MIMO capabilities, and wherein the common first multicast CID is different from the common second multicast CID.

19. The apparatus of claim 18, wherein the first communication entity or the second communication entity is a mobile station served by a base station.

20. The apparatus of claim 18, wherein the first group of communication entities or the second group of communication entities comprises a group of mobile stations served by a common base station.

21. An apparatus for a wireless communication system with multicast and broadcast services (MBS), comprising:
means for transmitting a downlink MAP (DL-MAP) message, the DL-MAP message comprising an MBS-MAP Information Element (IE), wherein the MBS-MAP IE contains first multiple-input multiple-output (MIMO) information that identifies an MBS-MAP burst with at least one of a plurality of MIMO capabilities, wherein the plurality of MIMO capabilities comprise at least one of: a vertical spatial multiplexing, a horizontal spatial multiplexing, a space time coding, or a combination thereof;

means for transmitting the MBS-MAP burst using the at least one of the plurality of MIMO capabilities specified by the first MIMO information, wherein the MBS-MAP burst contains second MIMO information that identifies an MBS data burst with at least one of the plurality of MIMO capabilities, wherein at least one of the first MIMO information or the second MIMO information comprises information specifying at least one of: a space time coding scheme, a type of channel matrix, a number of layers in the communication system, or a combination thereof; and means for transmitting the MBS data burst using the at least one of the plurality of MIMO capabilities specified by the second MIMO information.

22. The apparatus of claim 21, wherein the first MIMO information and the second MIMO information are different.

23. The apparatus of claim 21, wherein the MBS-MAP burst with the second MIMO information comprises at least one of: an MBS DATA IE, an extended MBS DATA IE, and an MBS DATA Time Diversity IE.

24. The apparatus of claim 21, further comprising:
means for grouping a plurality of mobile stations that support MIMO MBS data bursts into a MIMO-supported MBS group with a common first multicast connection identifier (CID);

means for grouping a plurality of mobile stations that do not support MIMO MBS data bursts into a non-MIMO MBS group with a common second multicast CID different than the common first multicast CID; and means for simultaneously transmitting MIMO MBS data burst for the MIMO-supported MBS group and non-MIMO data burst for the non-MIMO MBS group.

25. An apparatus for a wireless communication system with multicast and broadcast services (MBS), comprising:
means for receiving a downlink MAP (DL-MAP) message, the DL-MAP message comprising an MBS-MAP Information Element (IE), wherein the MBS-MAP IE contains first multiple-input multiple-output (MIMO) information that identifies an MBS-MAP burst with at least one of a plurality MIMO capabilities, wherein the plurality of MIMO capabilities comprise at least one of: a vertical spatial multiplexing, a horizontal spatial multiplexing, a space time coding, or a combination thereof;

means for receiving and decoding the MBS-MAP burst using the at least one of the plurality of MIMO capabilities specified by the first MIMO information, wherein the MBS-MAP contains second MIMO information that identifies an MBS data burst with at least one of the plurality of MIMO capabilities, wherein at least one of the first MIMO information or the second MIMO information comprises information specifying at least one of: a space time coding scheme, a type of channel matrix, a number of layers in the communication system, or a combination thereof; and means for receiving and decoding the MBS data burst using the at least one of the plurality of MIMO capabilities specified by the second MIMO information.

26. The apparatus of claim 25, wherein the first MIMO information and the second MIMO information are different.

27. The apparatus of claim 25, wherein the MBS-MAP burst with the second MIMO information comprises at least one of: an MBS DATA IE, an extended MBS DATA IE, and an MBS DATA Time Diversity IE.

28. The apparatus of claim 25, further comprising:
means for receiving and decoding MIMO MBS data bursts at a first communication entity that belongs to a first group of communication entities with a common first multicast connection identifier (CID), wherein the first group of communication entities supports the MBS data bursts with at least one of the plurality of MIMO capabilities; and means for receiving and decoding non-MIMO MBS data bursts at a second communication entity that belongs to a second group of communication entities with a common second multicast CID, wherein the second group of communication entities does not support the MBS data bursts with any of the plurality of MIMO capabilities, and wherein the common first multicast CID is different from the common second multicast CID.

29. The apparatus of claim 28, wherein the first communication entity or the second communication entity is a mobile station served by a base station.

30. The apparatus of claim 28, wherein the first group of communication entities or the second group of communication entities comprises a group of mobile stations served by a common base station.

31. A computer-program product for a wireless communication system with multicast and broadcast services (MBS), comprising a non-transitory computer readable medium having instructions stored thereon, the instructions being executable by one or more processors and the instructions comprising:

instructions for transmitting a downlink MAP (DL-MAP) message, the DL-MAP message comprising an MBS-MAP Information Element (IE), wherein the MBS-MAP IE contains first multiple-input multiple-output (MIMO) information that identifies an MBS-MAP burst with at least one of a plurality of MIMO capabilities, wherein the plurality of MIMO capabilities comprise at least one of: a vertical spatial multiplexing, a horizontal spatial multiplexing, a space time coding, or a combination thereof;

instructions for transmitting the MBS-MAP burst using the at least one of the plurality of MIMO capabilities specified by the first MIMO information, wherein the MBS-MAP burst contains second MIMO information that identifies an MBS data burst with at least one of the plurality of MIMO capabilities, wherein at least one of the first MIMO information or the second MIMO information comprises information specifying at least one of: a space time coding scheme, a type of channel matrix, a number of layers in the communication system, or a combination thereof; and instructions for transmitting the MBS data burst using the at least one of the plurality of MIMO capabilities specified by the second MIMO information.

32. The computer-program product of claim 31, wherein the first MIMO information and the second MIMO information are different.

33. The computer-program product of claim 31, wherein the MBS-MAP burst with the second MIMO information comprises at least one of: an MBS DATA IE, an extended MBS DATA IE, and an MBS DATA Time Diversity IE.

34. The computer-program product of claim 31, wherein the instructions further comprise:

instructions for grouping a plurality of mobile stations that support MIMO MBS data bursts into a MIMO-supported MBS group with a common first multicast connection identifier (CID);

instructions for grouping a plurality of mobile stations that do not support MIMO MBS data bursts into a non-MIMO MBS group with a common second multicast CID different than the common first multicast CID; and instructions for simultaneously transmitting MIMO MBS data burst for the MIMO-supported MBS group and non-MIMO data burst for the non-MIMO MBS group.

35. A computer-program product for a wireless communication system with multicast and broadcast services (MBS), comprising a non-transitory computer readable medium having instructions stored thereon, the instructions being executable by one or more processors and the instructions comprising:

instructions for receiving a downlink MAP (DL-MAP) message, the DL-MAP message comprising an MBS-MAP Information Element (IE), wherein the MBS-MAP IE contains first multiple-input multiple-output (MIMO) information that identifies an MBS-MAP burst with at least one of a plurality of MIMO capabilities, wherein the plurality of MIMO capabilities comprise at least one of: a vertical spatial multiplexing, a horizontal spatial multiplexing, a space time coding, or a combination thereof;

instructions for receiving and decoding the MBS-MAP burst using the at least one of the plurality of MIMO capabilities specified by the first MIMO information, wherein the MBS-MAP contains second MIMO information that identifies an MBS data burst with at least one of the plurality of MIMO capabilities, wherein at least one of the first MIMO information or the second MIMO information comprises information specifying at least one of: a space time coding scheme, a type of channel matrix, a number of layers in the communication system, or a combination thereof; and instructions for receiving and decoding the MBS data burst using the at least one of the plurality of MIMO capabilities specified by the second MIMO information.

36. The computer-program product of claim 35, wherein the first MIMO information and the second MIMO information are different.

37. The computer-program product of claim 35, wherein the MBS-MAP burst with the second MIMO information comprises at least one of: an MBS DATA IE, an extended MBS DATA IE, and an MBS DATA Time Diversity IE.

38. The computer-program product of claim 35, wherein the instructions further comprise:

instructions for receiving and decoding MIMO MBS data bursts at a first communication entity that belongs to a first group of communication entities with a common first multicast connection identifier (CID), wherein the first group of communication entities supports the MBS data bursts with at least one of the plurality of MIMO capabilities; and instructions for receiving and decoding non-MIMO MBS data bursts at a second communication entity that belongs to a second group of communication entities with a common second multicast CID, wherein the second group of communication entities does not support the MBS data bursts with any of the plurality of MIMO capabilities, and wherein the common first multicast CID is different from the common second multicast CID.

39. The computer-program product of claim 38, wherein the first communication entity or the second communication entity is a mobile station served by a base station.

40. The computer-program product of claim 38, wherein the first group of communication entities or the second group of communication entities comprises a group of mobile stations served by a common base station.

* * * * *